Nov. 3, 1970   J. H. OLBERMANN, JR   3,537,761
TRACK PLATE FOR ENDLESS TRACK VEHICLES
Filed Oct. 18, 1968
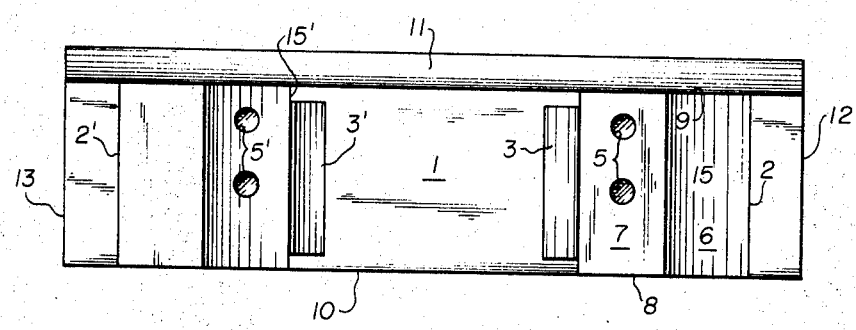
FIG.1
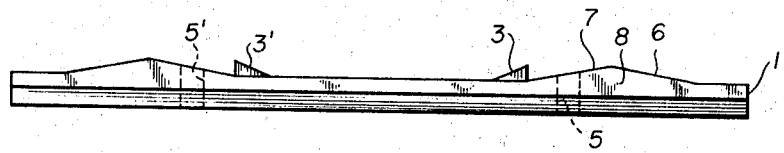
FIG.2
FIG.3
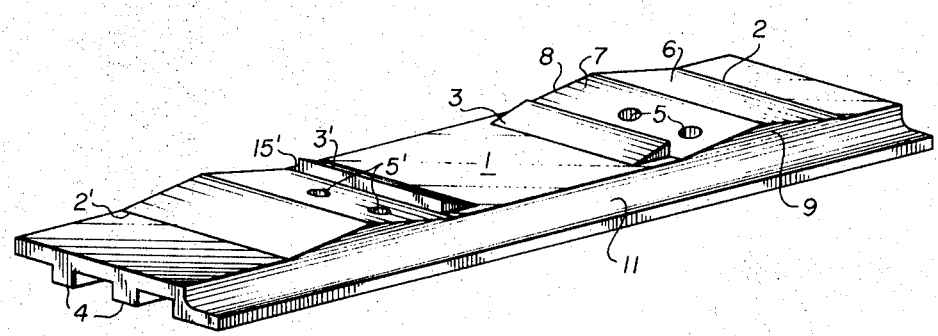
FIG.4
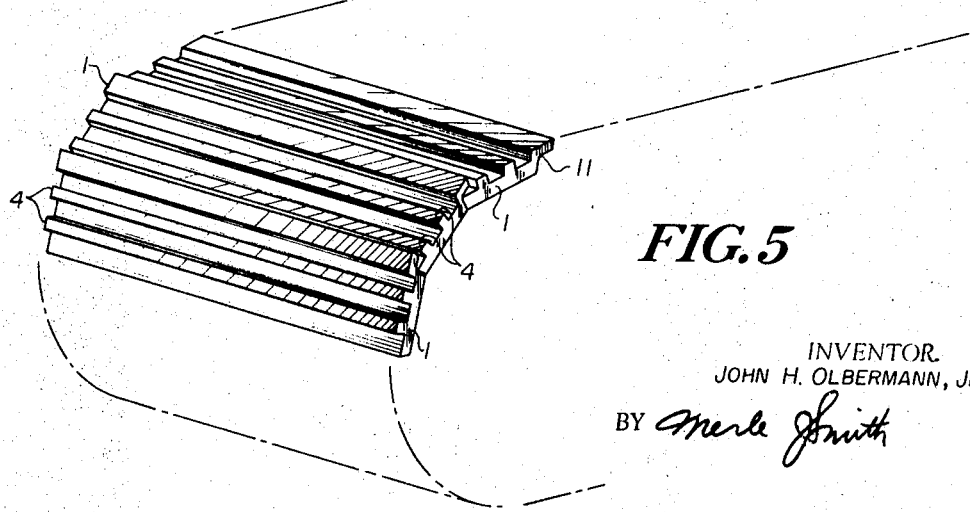
FIG.5
INVENTOR.
JOHN H. OLBERMANN, JR.
BY Merle Smith
ATTORNEY

3,537,761
TRACK PLATE FOR ENDLESS TRACK VEHICLES
John H. Olbermann, Jr., Edison, N.J.
(3600 N. 6th Ave., Phoenix, Ariz. 85012)
Filed Oct. 18, 1968, Ser. No. 768,687
Int. Cl. B62d 55/26
U.S. Cl. 305—54                         4 Claims

ABSTRACT OF THE DISCLOSURE

This invention relates to an improved track process for endless track vehicles, preferably of the towed or non-self-propelled type. The improvement comprises a track plate reinforcement member, triangular in cross section affixed on the track rail engaging surface which serves to aid in reducing strain and preventing breakage and to increase the useful life of the track plate. An additional feature is a right triangular alignment element adjacent the interior edge of the reinforcement member, the alignment means providing an additional safeguard in maintaining the track plate in proper alignment.

SUMMARY OF THE INVENTION

Heavy duty vehicles frequently run on endless tracks e.g., of the type in U.S. Pat. 2,211,896 or 2,964,361. These include, for example, self-propelled vehicles like tractors, road building equipment or towed vehicles like dump trailers such as those used in garbage hauling and disposal. The endless track on which such vehicles move generally comprise a series of track plates, which are the ground engaging members. These plates are mounted on track link units, which when joined together in the aggregate constitute the track rail. The track rail in turn engages the wheel assembly.

The track plates, which are the weight bearing and distributing surfaces are subject to great strain and wear. It is not uncommon for the track plates to bend and break after a comparatively short period of service.

It has been found that a great deal of stress and bending and breakage occur at that portion of the track plate which bears on the track rail.

It is therefore an object of this invention to provide an improved track plate which has less tendency to bend and break. It is a further object of this invention to provide such an improved track plate which has an additional safeguard against lateral slippage.

DESCRIPTION OF THE DRAWINGS

FIG. 1 is an enlarged top elevational view of the track rail engaging surface of the track plate.

FIG. 2 is an enlarged front elevational view of the track plate.

FIG. 3 is an enlarged end elevational view of the track plate.

FIG. 4 is a perspective view of the track plate showing in particular the track rail engaging surface.

FIG. 5 is a perspective view indicating how the track plates of this invention appear on a portion of the wheel assembly.

DETAILED DESCRIPTION OF THE INVENTION

Track plate 1 is an elongated plate of generally rectangular shape having parallel leading and trailing edges 10 and 11, respectively, and parallel sides 12 and 13.

FIG. 1 shows the rail engaging surface of plate 1, hereinafter referred to as the interior surface, with the track plate reinforcing member 2 in place. Track plate reinforcing member 2 is affixed to the flat interior, rail engaging, surface of the track plate. It may be cast as an integral part of the track plate or may be a separate, replaceable element, for example, affixed by welding or preferably bolted through the bolt holes 5 shown in the figures. The track plate reinforcing member has a triangular or wedge shaped cross section, the flat side being affixed to the interior track plate surface. The center line 15 of the track rail engaging surface is parallel to the sides 12 and 13 and the downward taper is gradual from the center line toward each of the sides, the tapered surfaces 6 and 7 preferably being the same in dimensions and area. The leading edge 8 and trailing edge 9 of the reinforcing member are preferably straight edges, parallel to each other and perpendicular to the flat surface of the track plate, though this is not strictly necessary.

The track plate includes one or more reinforcing members, usually two, to correspond with the number of track rails upon which the track rides, and in the figures corresponding parts of duplicate members are indicated by primed numbers. The reinforcing members 2 are spaced inwardly from the lateral edges 12 and 13 of the track plate to properly position the track on the track rail or rails. Each track rail is correspondingly inwardly tapered or provided with a depression, gap, recess or other in order to permit the mating with the track plate reinforcing member with which it is in contact.

It is preferable for the long dimension of the track plate reinforcing member 2 to be coextensive with the flat dimension of sides 12 and 13 of the track plate, as shown in FIGS. 1 and 3. The track plate reinforcing member is best positioned with its trailing edge 9 adjacent the beginning of the elongated radius 11 conventionally found in the trailing edge of the track plate and extening to the leading edge. It may, however, be somewhat shorter but should extend the greater part of that dimension, i.e., more than half of the flat portion of the lateral dimension of the track plate. The width of this member preferably approximates the width of the track rail. The height of the reinforcing member 2, i.e., the distance from base to point of the triangle at the center line, is preferably about one fourth to three fourths the thickness of the track plate and is best about one half the thickness of the plate.

As an optional feature, the most preferred modification of this invention includes alignment means 3 which, as a precautionary measure, aids in avoiding slippage of the track plate on the track rail, e.g., in the event the bolts work loose or shear, and further reduces the stress and breakage. Alignment means 3, as shown more particularly in FIG. 2, may be triangular in cross section, preferably a right triangle, and is mounted adjacent the interior side of the latter, one side of the right angle being in contact with the track plate surface and the other side of the right angle being perpendicular to that surface. The alignment means is somewhat shorter in length than the track plate reinforcing member to allow clearance for the inside of the track link pin. The perpendicular extending side of retainer member 3 moves along the side of and in loose contact with the track rail. This reduces lateral motion of the plate on the rail if the attachment to the track link loosens or breaks and further aids in reducing breakage. Preferably, the retainer element 3 is about the same in height as reinforcing member 2.

The ground engaging surface of the track plate includes conventional ribs 4, extending from side to side across the long dimension of the track plate, as shown in FIGS. 3, 4 and 5.

In use, as indicated in FIG. 5, the track plates of this invention are joined into the assembled track in conventional manner, e.g., by track link units. The track is mounted on the track rail so that track plate reinforcing members 2 ride on the track rails, in tapers, recesses or the like provide in the rails to accommodate the members 2. The side alignment means 3, when utilized, abut the interior edge of the track rail limiting any tendency toward sidewise motion of the track on the rail.

The track reinforcing members 2 thus aid in reducing the stress on the track plates so that bending of the track plates is reduced and breakage also reduced. While sidewise slippage of the track is reduced by the track plate reinforcing members riding in the taper in the track rail, the additional precaution of the side alignment means further reduces any tendency toward sidewise motion aiding in the elimination of stress and breakage. When each track rides on a plurality of rails, the reinforcing and stabilizing members are mounted on each track plate in accordance with the number of rails, and the tendency toward breakage is lessened accordingly.

What is claimed is:

1. A track plate for endless track vehicles which comprises an elongated plate, substantially flat on the interior track rail engaging surface, a reinforcement member, triangular in cross section, affixed to said interior track rail engaging surface spaced inwardly from and with the apex extending parallel to the lateral side of the track plate substantially coextensive in length with said track plate and adapted to be received in the upper surface of a track rail, one reinforcement member being provided for each track rail.

2. A track plate as in claim 1 wherein the height of the track reinforcement member is about one fourth to three fourths the thickness of the track plate.

3. A track plate as is claim 1 wherein alignment means is affixed to the track plate adjacent to the interior side of each track reinforcement member.

4. A track plate as in claim 1 wherein said alignment means is a right triangle in cross section, is approximately coextensive in length with said track plate reinforcement member and the right angle side of said alignment means is adjacent to and parallel with the side of said member.

References Cited

UNITED STATES PATENTS

| 2,211,896 | 8/1940 | Johnston | 305—54 |
| 2,982,585 | 5/1961 | Murtaugh | 305—54 |
| 3,336,088 | 8/1967 | Bauer | 305—54 |

FOREIGN PATENTS

| 1,067,020 | 1/1954 | France. |

OTHER REFERENCES

German printed application, Kaelble, January 1966.

RICHARD J. JOHNSON, Primary Examiner